United States Patent
Davis et al.

(10) Patent No.: US 9,861,889 B2
(45) Date of Patent: Jan. 9, 2018

(54) SYSTEM AND METHOD FOR LOCATION-BASED GAMING WITH REAL WORLD LOCATIONS AND POPULATION CENTERS

(71) Applicant: Qonqr, LLC, Saint Paul, MN (US)

(72) Inventors: Scott Davis, Mounds View, MN (US); Jeff Diercks, Maple Grove, MN (US); Donn Felker, Scottsdale, AZ (US); Jessy Houle, Eden Prairie, MN (US); Dave MacDonald, Woodbury, MN (US); Justin Peck, Spooner, WI (US); Andy Pickett, Burlingame, CA (US)

(73) Assignee: Qonqr, LLC, Mounds View, MN (US)

( * ) Notice: Subject to any disclaimer, the term of this patent is extended or adjusted under 35 U.S.C. 154(b) by 331 days.

(21) Appl. No.: 14/870,295

(22) Filed: Sep. 30, 2015

(65) Prior Publication Data
US 2016/0016083 A1    Jan. 21, 2016

Related U.S. Application Data

(63) Continuation of application No. 14/072,783, filed on Nov. 5, 2013, now abandoned, which is a (Continued)

(51) Int. Cl.
*A63F 13/235* (2014.01)
*A63F 13/79* (2014.01)
(Continued)

(52) U.S. Cl.
CPC ............ *A63F 13/235* (2014.09); *A63F 13/12* (2013.01); *A63F 13/216* (2014.09);
(Continued)

(58) Field of Classification Search
CPC .... A63F 13/216; A63F 13/235; A63F 13/332; A63F 13/5378; A63F 13/57; A63F 13/67;
(Continued)

(56) References Cited

U.S. PATENT DOCUMENTS 7,077,749 B1    7/2006  Wang
7,593,740 B2    9/2009  Crowley
(Continued)

FOREIGN PATENT DOCUMENTS

WO    2008115858 A1    9/2008

OTHER PUBLICATIONS

Ross A Williams; Non-Final Office Action for U.S. Appl. No. 13/621,120; USPTO Communication; dated Jun. 5, 2013.
(Continued)

*Primary Examiner* — William H McCulloch, Jr.
(74) *Attorney, Agent, or Firm* — Grumbles Law PLLC; Brittany Nanzig

(57) ABSTRACT

The present disclosure is directed to an online or mobile application for playing a location-based multiplayer game. In one configuration and by non-limiting example, the game is a cross-platform, location-based, massively-multiplayer game of strategy. Players interact to capture millions of battle zones that correspond to real world locations in hundreds of countries using their mobile devices, web browsers, and consoles.

7 Claims, 12 Drawing Sheets

Related U.S. Application Data continuation-in-part of application No. 13/621,120, filed on Sep. 15, 2012, now abandoned.

(60) Provisional application No. 61/535,186, filed on Sep. 15, 2011.

(51) Int. Cl.

| | | |
|---|---|---|
| *A63F 13/57* | (2014.01) | |
| *A63F 13/67* | (2014.01) | |
| *A63F 13/847* | (2014.01) | |
| *A63F 13/216* | (2014.01) | |
| *A63F 13/332* | (2014.01) | |
| *A63F 13/92* | (2014.01) | |
| *A63F 13/30* | (2014.01) | |
| *A63F 13/5378* | (2014.01) | |
| *A63F 13/77* | (2014.01) | |

(52) U.S. Cl.
CPC ............ *A63F 13/332* (2014.09); *A63F 13/57* (2014.09); *A63F 13/67* (2014.09); *A63F 13/79* (2014.09); *A63F 13/847* (2014.09); *A63F 13/92* (2014.09); *A63F 13/5378* (2014.09); *A63F 13/77* (2014.09); *A63F 2300/204* (2013.01); *A63F 2300/406* (2013.01); *A63F 2300/5573* (2013.01); *A63F 2300/69* (2013.01)

(58) Field of Classification Search
CPC ........ A63F 13/77; A63F 13/79; A63F 13/847; A63F 13/92; A63F 2300/204; A63F 2300/406; A63F 2300/5573; A63F 2300/69
See application file for complete search history.

(56) References Cited

U.S. PATENT DOCUMENTS

| | | | |
|---|---|---|---|
| 8,204,513 B2 | 6/2012 | Crowley | |
| 8,260,858 B2 | 9/2012 | Belz et al. | |
| 8,282,491 B2 * | 10/2012 | Auterio | A63F 13/12 463/42 |
| 8,287,383 B1 * | 10/2012 | Etter | H04L 67/38 463/42 |
| 8,287,384 B2 * | 10/2012 | Auterio | A63F 13/12 463/42 |
| 8,348,768 B2 * | 1/2013 | Auterio | A63F 13/12 463/42 |
| 8,444,491 B2 * | 5/2013 | Bethke | A63F 13/822 463/42 |
| 8,491,395 B2 * | 7/2013 | Auterio | A63F 13/12 463/42 |
| 8,496,532 B1 * | 7/2013 | Bethke | A63F 13/822 463/42 |
| 8,506,409 B2 * | 8/2013 | Bethke | A63F 13/822 463/42 |
| 8,556,719 B1 * | 10/2013 | Mahajan | A63F 13/216 463/36 |
| 8,608,570 B1 * | 12/2013 | Mahajan | A63F 13/79 273/274 |
| 8,727,887 B2 * | 5/2014 | Mahajan | A63F 13/79 273/274 |
| 8,812,356 B1 * | 8/2014 | Mahajan | G09B 7/02 705/14.12 |
| 9,033,803 B1 * | 5/2015 | Etter | H04L 67/38 463/30 |
| 9,220,985 B1 * | 12/2015 | Auterio | A63F 13/00 |
| 9,355,404 B2 * | 5/2016 | Mahajan | G09B 7/02 |
| 9,364,744 B2 * | 6/2016 | Auterio | A63F 13/12 |
| 9,403,087 B2 * | 8/2016 | Riley | A63F 13/12 |
| 9,630,110 B2 * | 4/2017 | Kruglick | A63F 13/65 |
| 9,656,172 B2 * | 5/2017 | Nelson | A63F 13/79 |
| 9,669,318 B2 * | 6/2017 | Etter | A63F 13/85 |
| 9,764,229 B2 * | 9/2017 | Dawson | A63F 13/216 |
| 2002/0090985 A1 * | 7/2002 | Tochner | A63F 13/12 463/1 |
| 2002/0103031 A1 | 8/2002 | Neveu et al. | |
| 2004/0193441 A1 * | 9/2004 | Altieri | G06Q 30/02 709/203 |
| 2006/0223635 A1 * | 10/2006 | Rosenberg | A63F 13/10 463/37 |
| 2007/0149286 A1 * | 6/2007 | Bemmel | A63F 13/12 463/41 |
| 2008/0062120 A1 * | 3/2008 | Wheeler | G08B 25/016 345/156 |
| 2009/0017913 A1 | 1/2009 | Bell et al. | |
| 2010/0113160 A1 | 5/2010 | Belz et al. | |
| 2011/0312423 A1 * | 12/2011 | Mosites | G06Q 10/00 463/42 |
| 2012/0040763 A1 * | 2/2012 | Auterio | A63F 13/12 463/42 |
| 2012/0094767 A1 | 4/2012 | Presgraves | |
| 2013/0072308 A1 * | 3/2013 | Peck | A63F 13/65 463/42 |
| 2014/0155156 A1 * | 6/2014 | Peck | A63F 13/12 463/31 |
| 2015/0174481 A1 * | 6/2015 | Tobin | A63F 13/216 463/7 |
| 2016/0016083 A1 * | 1/2016 | Davis | A63F 13/12 463/5 |
| 2016/0346683 A1 * | 12/2016 | Worrall | A63F 13/26 |
| 2017/0050113 A1 * | 2/2017 | Mullen | A63F 13/65 |
| 2017/0128837 A1 * | 5/2017 | Khanna | A63F 13/69 |
| 2017/0182422 A1 * | 6/2017 | Etter | A63F 13/65 |
| 2017/0239565 A1 * | 8/2017 | Morishita | A63F 13/335 |
| 2017/0266564 A1 * | 9/2017 | Choudhuri | A63F 13/795 |

OTHER PUBLICATIONS

Ross A Williams; Non-Final Office Action for U.S. Appl. No. 14/072,783; USPTO Communication; dated Jan. 15, 2015.
Ross A Williams; Final Office Action for U.S. Appl. No. 14/072,783; USPTO Communication; dated Jul. 1, 2015.

* cited by examiner

900

US 9,861,889 B2

SYSTEM AND METHOD FOR LOCATION-BASED GAMING WITH REAL WORLD LOCATIONS AND POPULATION CENTERS

CROSS-REFERENCE TO RELATED APPLICATION

This application is a continuation of U.S. application Ser. No. 14/072,283, titled SYSTEM AND METHOD FOR LOCATION-BASED GAMING WITH REAL WORLD LOCATIONS AND POPULATION CENTERS, filed Nov. 5, 2013, which is a continuation-in-part of U.S. application Ser. No. 13/621,120, titled LOCATION-BASED MULTI-PLAYER GAME SYSTEM AND METHOD, filed Sep. 15, 2012, which claims the benefit of U.S. Provisional Application Ser. No. 61/535,186, titled LOCATION-BASED MULTIPLAYER GAME SYSTEM AND METHOD.

BACKGROUND

Location-based gaming is emerging and recognized gaming genre in mobile gaming. Most location-based games are centering the activity of the game on the Player versus Player (PVP) model of gameplay. This is primarily done through role play fighting, or "tag" based games, where players are interacting with each other individually as part of the game mechanics. Very few location-based games are leveraging the Player versus Everyone (PVE) game model. Furthermore, what is missing in location-based mobile gaming is the adaptation of classic board gaming characteristics of area domination. Innumerable iterations of this style of territory domination concept have been developed over the years for both physical and video games, but none have adapted to the location-based Real Time Strategy Massively Multi-player Online (RTSMMO) game for mobile (smart phones, tablets and other smart devices).

SUMMARY

In general terms, the present disclosure is directed to an online or mobile application for playing a location-based multiplayer game. In one configuration and by non-limiting example, the game is a cross-platform, location-based, massively-multiplayer game of strategy. Players interact to capture millions of battle zones that correspond to real world locations in hundreds of countries using their mobile devices, web browsers, and consoles.

Reference is made throughout the present disclosure to certain aspects, including characters, of one embodiment of the game described herein. Such references to characters and other aspects of the presently described game do not limit the scope of the claims attached hereto. Additionally, any examples set forth in this disclosure are not intended to be limiting and merely set forth some of the many possible embodiments for the appended claims. It is to be understood that the phraseology and terminology used herein are for the purpose of description and should not be regarded as limiting.

In the game world of one embodiment of the present invention, an artificial intelligence (sometimes referred to herein as "AI" or "QONQR") has emerged on the internet. Its motives, allegiances, and objectives are unknown. Humanity has argued fiercely over QONQR's intentions and split into viciously rival factions or multiplayer groups. When they enlist, users or players align themselves with one of those three factions (sometimes referred to herein as "The LEGION," "The SWARM" and "The FACELESS").

THE LEGION unite under the shared goals of destroying QONQR and saving humanity by crushing the nascent AI before it can mature. They are led by Agent Sunday, a commander of the NSA's Turing Task Force which has been valiantly stamping out dangerous AIs for years.

THE SWARM are convinced that QONQR promises an era of unprecedented technological advancement and human prosperity. Nanobot weaponry expert Kimyo Nagumo leads this faction in the battle to defend QONQR and assemble its futuristic technology, accelerating humanity's path into the future.

THE FACELESS are a loosely organized faction of militant hackers who want QONQR's technology for their own ends, but want to prevent the unavoidable nightmare of human slavery they believe it portends. When they choose to communicate, they do so through an anonymous vigilante who goes by the name Prometheus.

Once they have aligned themselves with a faction, players try to capture as many zones (as described in detail below) as possible for their faction by using their mobile device to deploy nanobot swarms (as described in detail below). The faction with the most bots in a zone controls that zone. Players can build bases in captured zones and harvest resources there. As their accomplishments and conquests grow, players will level up, be awarded new medals and ribbons, and advance through the ranks from Private all the way up to General.

The game described herein is of a cross-platform type, with some players playing location-based game aspects from their smart phones (for example, iOS, Android, WP7), and others dealing with base construction and strategic coordination from their laptops and desktop computers through social networks, such as Facebook, and/or web interfaces. The majority of the game logic exists in cloud-based data centers with each interface (regardless of type) making common REST calls to the server, thus allowing everyone to play in the same single massively multiplayer game world.

DETAILED DESCRIPTION

Figure 1:
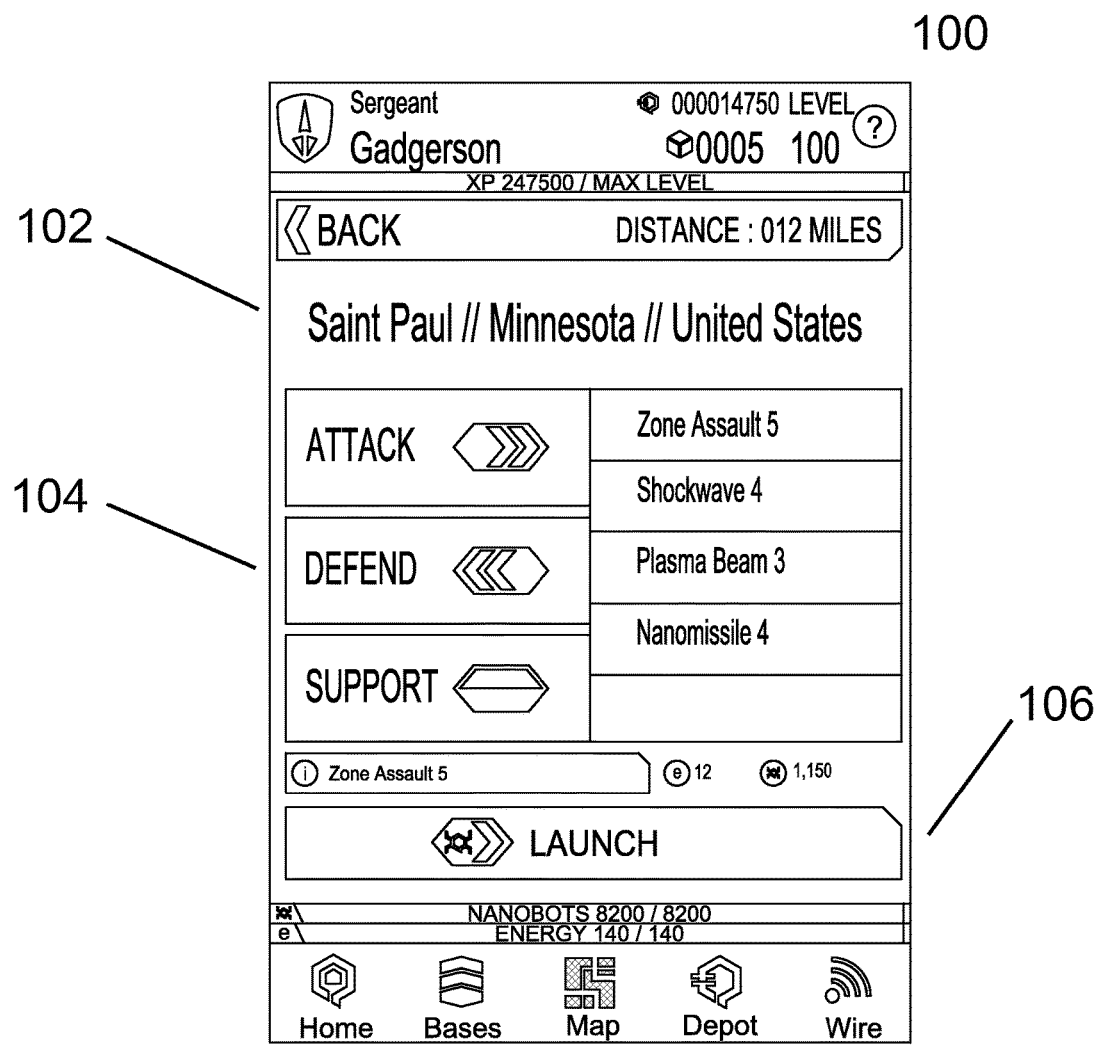
FIG. 1 illustrates an example user interface wherein a user can select a command and launch bots into a battle zone according to one embodiment of the present invention.

Various user interfaces and embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims. It is understood that various omissions and substitutions of equivalents are contemplated as circumstances may suggest or render expedient, but these are intended to cover applications or embodiments without departing from the spirit or scope of the claims attached hereto. Also, it is to be understood that the phraseology and terminology used herein are for the purpose of description and should not be regarded as limiting.

The online or mobile application of the present invention creates a game experience wherein the real world is the game board and each player is a piece moving within the game. Players use a mobile device or other computing device as a way to see the progress of the game and facilitate the game actions.

The embodiments of the invention create a system by which players of a mobile, location-base RTSMMO game are able to battle for, capture and control real places in the physical world through the game. In addition these real places are publicly cataloged and recognizable locations that relate to people's real lives. The locations are not created as part of the players' activities, but correspond to, externally, publicly recorded places. Furthermore, the entire game environment is a PVE experience where everyone is playing in the same game world and has the ability to impact any and all players in their proximity, not just one player at a time, as with a PVP game.

Most specifically, this invention allows players to make population centers (cities, towns, villages, and neighborhoods) the primary objective of a game, whereby players are fighting in the game to capture and maintain control of their hometown, the places they visit, and the nearby cities and town, with the restriction that battling for such places can only be done while the player is with physical proximity of the location, with a distance as determined by their GPS coordinates and the game play rules. The emotional attachment people have to their hometown creates a unique distinction between battling in a game to control a meaningful place in the real world, compared to some artificially created "area" on a map. Additionally, gameplay can be extended to include other externally geo-coded and publicly recognizable locations, having a more precise latitude and longitude resolution that than of an entire city, such as airports, power plants, hospitals, or even geo-caches. Such hyper-local locations can enhance the perceived emotional, as well as assigned game value of the city or town in question. The result is a mobile location-based RTSMMO game wherein the quest for "world domination" is conducted in the real world, and accomplished by capturing real places where the player is physically located.

Players using a smart phone to play the online or mobile application of the present invention are provided with a graphical user interface sometimes referred to herein as a "Scope" interface. In the game, the Scope is based on QONQR technology, and enables the user to generate nanobot swarms and deploy them in various powerful command formations. As used herein, a "nanobot" or "bot" refers to a type of virtual game piece that may be used by a player or group of players (or "faction") in the described game to attack or gain control of any certain "zone" or specified physical region of game play; several nanobots may be collectively referred to as a "swarm."

Most screens in the game provide the same scope Heads-Up-Display (HUD) information. This includes the player's codename (or username), current level and rank, current "Cube" (premium currency) balance, current "Qredit" (standard currency) balance, a help button, and a bottom navigation bar. As players navigate from screen to screen this HUD stays constant, with its fields being updated as the players' actions impact its values.

Some drawings provided with this specification which depict example user interfaces are formatted as they appear in the iOS version of the mobile application. There are slight differences between mobile platforms (e.g. WP7 utilizes the standard Pivot Control and is limited to four bottom navigation buttons, etc.). These minor aesthetic differences do not significantly impact gameplay.

Action Results Overlay

In one embodiment, a user interface may appear when a player selects a command and deploys their nanobots into a battle zone and the results of that action can be displayed in an overlay. Information may include, but is not limited to:

Which faction now controls the battle zone

The number of experience points the player has been awarded

Whether or not the player has been awarded medals or ribbons

Whether or not the player has advanced in rank

The avatar of the player or players that participated in the battle

The specific details of the battle

The player then has the ability to share this information with external social networks (such as Twitter and Facebook)

Send Alert

Players can send an alert from the Zone Pin (described in more detail below) to either their friends who belong to the same faction, or all friends, to ask for assistance in a specified zone. This causes a message to be sent to the specified players' Wire Screen (the "Wire," as used in this specification, refers to the players' in-game communication hub or messaging system).

Base Detail

Players can build bases in battle zones to extract resources. These resources can be harvested and sold to the player's faction in exchange for Qredits (or standard currency). The efficiency and performance of a base is affected by the faction that controls the zone. Bases belonging to players in the controlling faction perform at peak capacity, while bases belonging to players in the $2^{nd}$ and $3^{rd}$ place factions see their bases' performance diminishing. The Base Detail screen shows who owns the base, what its current operational efficiency percentage is, and what messages have been left at the base.

Players viewing enemy bases can leave graffiti tags, which will negatively impact the performance of the base. Players viewing the bases of friends can leave messages as well as reinforce the base (contribute a nanobot swarm to help defray the impact of zone control). Players viewing their own bases can remove messages or graffiti tags, harvest resources, and/or send bots to reinforce their own base.

In some embodiments of the game, players are only allowed to reinforce each individual base three times per day, but there is no limit to the number of bases that can be reinforced.

Base List

Players can view a list of all of their bases, each base's tank capacity, and the number of bases they are allowed to construct. From this base list, a player can harvest resources and build or destroy one of their own bases.

Figure 7:
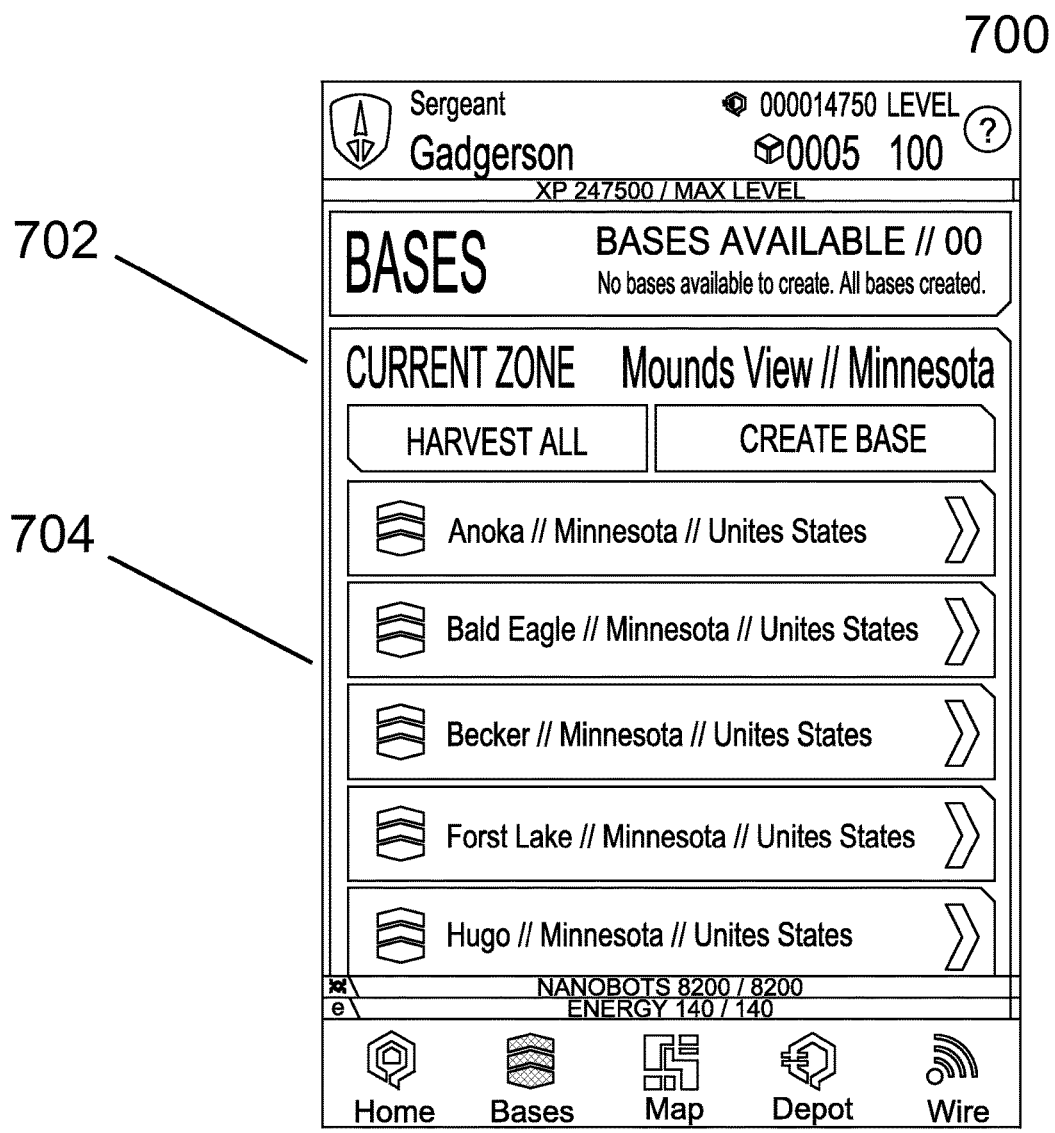
FIG. 7 illustrates an example user interface that may appear when a user scans for bases in the user's current zone according to one embodiment of the present invention.

Players may also scan for bases in their current zone 702 (the battle zone that corresponds to the player's physical location), as illustrated in FIG. 7. At the scanned bases screen 700, players will receive a list of all bases in the zone 704, and by clicking the base name they will be taken to that base's detail screen where they can reinforce or leave a message (if it is a friend's base) or leave a graffiti tag (if it is an enemy base).

Deployed Bots

In one embodiment of a user interface, players can see all battle zones (0 . . . n) in which they currently have bots deployed (the "Deployed Bots Screen"). Each battle zone lists the zone name, region, and country, as well as the total number of bots the player has in that zone with a bar showing percent when compared with all bots in the zone.

Players can scroll down to see the full list of battle zones. Each listed zone is a button which will take the player to the Tactical Screen for that zone.

Depot

In some embodiments, the top level screen in the application (sometimes referred to herein as the "Depot") can be navigated to by clicking the Depot button on the bottom navigation bar.

Players can use Qredits earned in the game to purchase items in the Depot. Some items can also be purchased using real world currency, which is converted into a premium game currency called Cubes. Each item shows an icon, an item name, the item cost (in Qredits or Cubes), and a button to purchase. Clicking the item name brings the player to the Item Detail Screen. Example items are: Energy Recharges, Bot Refills, Absorbers, Nanomissiles, E.M.P.s, Scope Upgrades, and additional Qredits.

Players may be prevented from making a purchase for a variety of reasons including, but not limited to: insufficient funds, or unmet level, rank, or faction requirements.

Friends

Players can invite other players to be friends, view and manage current friends, and review friend requests from other players on the friend screen.

Each player listed on the friend screen shows that player's avatar, codename, and faction color in a bar that doubles as a button link to that player's profile screen. The screen will scroll as much as necessary to show all data.

Friend inquiries can be accepted or rejected, and current friends can be removed or messaged from this screen as well.

If the player has linked additional social networks to the online or mobile application of the present invention, the player may also import or invite friends from those services from this screen.

Help

The yellow question mark icon in the upper right corner of the screen on every page links to context-sensitive help screens; there, players can read detailed information about the specific screen or action they were currently using.

Home

The Home Screen is the player's default screen. This is one of the top level screens (it can be reached using the bottom navigation bar). It shows the player's selected profile picture, the player's current rank, and the number of zones the player has captured or that the player currently controls.

The player can also use this screen as a launching point for all player specific information including, but not limited to, player settings, friends, inventory, schematics, ranks, medals and ribbons, and deployed bots.

Inventory

The inventory screen is similar to the Depot, but instead shows the items currently owned by the player.

Each inventory item row shows the item's icon, name, and quantity currently owned. Players can use Qredits earned in game to purchase additional items directly from this screen. Clicking the item name brings the player to the item detail screen. Example items include: energy recharges, bot refills, absorbers, nanomissiles, and E.M.P.s.

Players may be prevented from purchasing additional items if they have insufficient funds.

Item Detail

The Item Detail screen can be reached from either the Inventory or Depot Screens; it gives detailed information about a specified item when a player selects such item. Information included on this screen includes, but is not limited to the item name, description, currently owned quantity, price, item image, level required, and rank required. Players can buy an item directly from this screen, or use Previous and Next buttons to move between items.

Launch

The launch screen 100, an example of which is shown in FIG. 1, is one of the core screens in the play loop in some embodiments of the present invention. This is the screen in which players select a command and launch bots into a battle zone.

In the preferred embodiment, commands are grouped into three types: attack, defend, and support. Selecting a command type 104 on the left causes the specific command list on the right to repopulate. Clicking a specific command on the right selects that command and shows energy and bot cost. Clicking launch 106 will deploy that command in the selected battle zone. Clicking the command info line will bring the player to the launch detail screen.

Launching a formation of nanobots into a zone has an immediate effect on that zone for all players who had previously launched into the zone, and who still have active bots in the zone, of for players who have a base stabled in the zone. Every players actions impact all other players' actions in the game, if their launch activities intersect in a zone.

Players can launch bots that support their allies or destroy their enemies. The player will select different formations by their objectives. Each formation has a distinct purpose and affect all other players in the zone in different ways.

Some commands may be disabled if the player does not have the required items, required proximity to the zone, or sufficient level or rank.

Proximity to a zone is determined by algorithmically comparing the latitude and longitude of the player's physical location on the Earth to the zone's latitude and longitude specified in the game. Distance in either miles or kilometers is calculated and then compared to the maximum range possible for the formation. If the zone is within range of the player for the specified formation, the player may deploy the formation to attack, defend, or support the zone.

Example commands: Zone Assault, Shockwave, Plasma Beam, Bombard, Sear, Nanomissile, E.M.P., Deflection, Absorber, Hardened Lattice, Extinguish, Divert, Hype Screen, Seekers, Boosters, Strengthen, Jammers, and Weaken. Most commands have a short range, but others (like nanomissiles) available to higher level players can attack distant zones as well.

Launch Animation

Once a command formation has been launched, players will see an animation that displays which enemy faction player (if any) has been targeted, the type of bot formation being engaged, relative damage on both sides of the battle, and the battle outcome.

Launch Detail

Players can view the details of any of the launch formations on the launch detail screen. From here, players can choose to return to the primary launch screen or launch directly from the detail screen.

Information displayed about each formation includes, but is not limited to formation type, command name, description, command image, energy required, bots required, damage, shield, range, threat, aggression, survivability, level requirement, rank requirement, and item required (if any). The launch button 106 may be disabled if the player does not have the required items, required proximity to the zone, or sufficient level or rank.

Leaderboard

Figure 2:
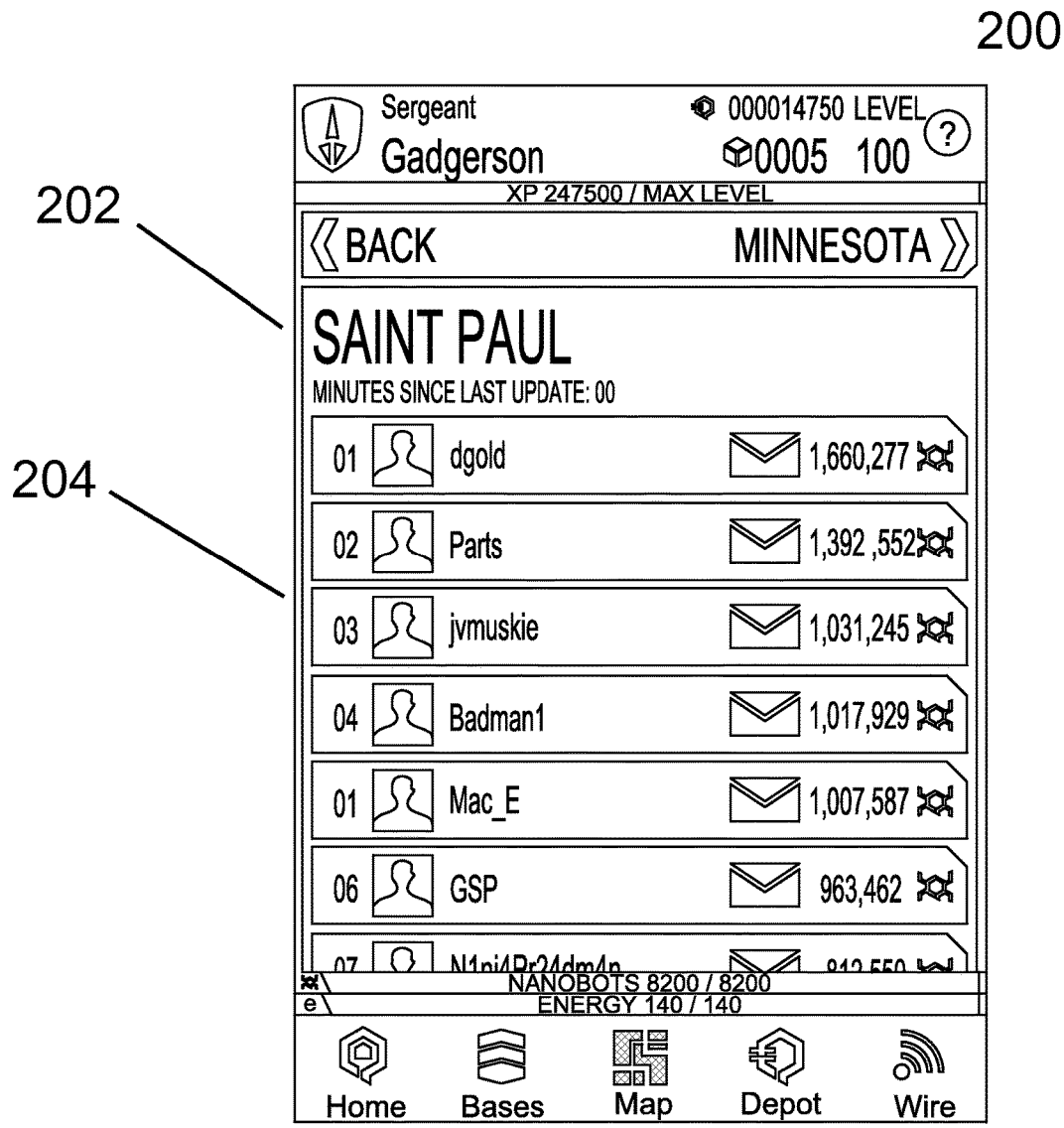
FIG. 2 illustrates an example user interface wherein a user can view a leaderboard showing which other users have the most bots in a specified location, according to one embodiment of the present invention.

Referring now to FIG. 2, an example user interface 200 is illustrated wherein a user can view a leaderboard 204 for a specified zone, region 4000, and country 500, which shows the players with the most bots in that specified location 202. The context of the leaderboard 204 is determined by the player's map selection on the screen that linked them to the leaderboard 204.

In some embodiments, the top players are shown ranked by bot count. Each player row shows that player's profile image, name, rank, faction color, and number of bots in the location 202. Each row is also a button link to that player's profile screen. Players with the same number of bots will tie for a ranking (e.g #1-25,000 bots, #2-15,000 bots, #2-15,000 bots, #4-5,000 bots, etc.).

Figure 4:
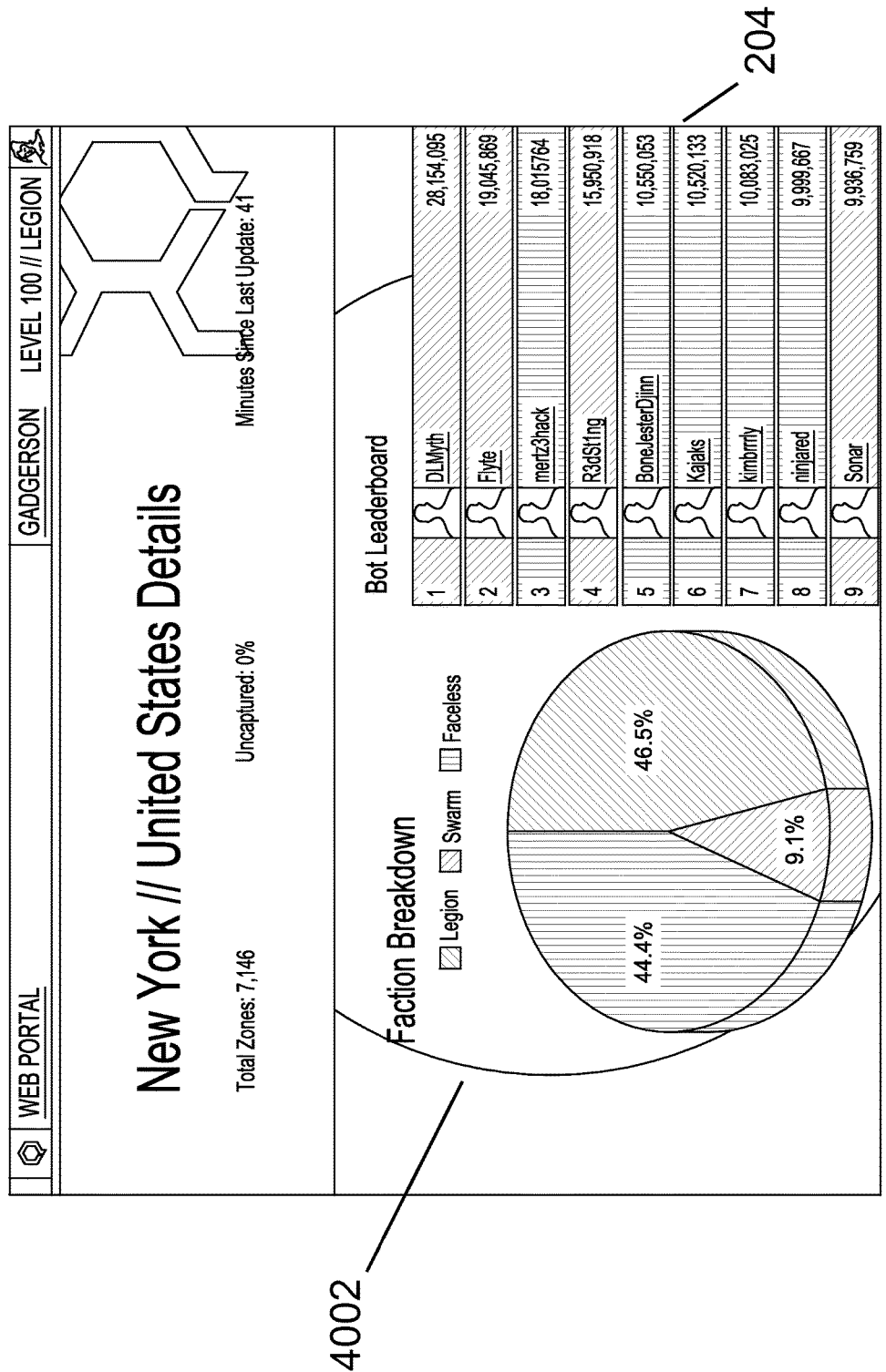
FIG. 4 illustrates an example user interface showing faction breakdown and a list of users with the highest number of bots at the sub-country region zoom level according to one embodiment of the present invention.
Figure 5:
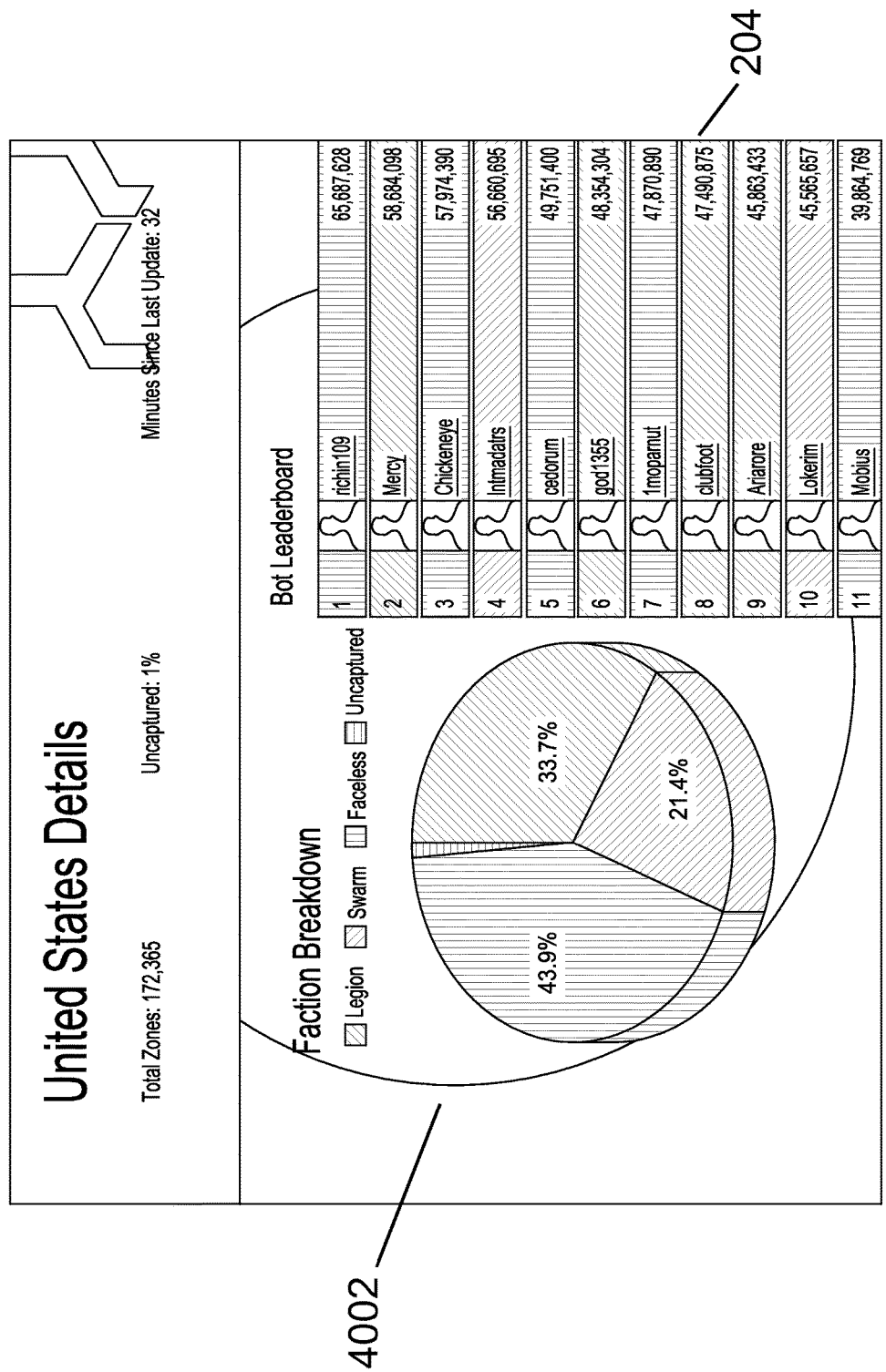
FIG. 5 illustrates an example user interface showing faction breakdown and a list of users with the highest number of bots at the country zoom level according to one embodiment of the present invention.
Figure 6:
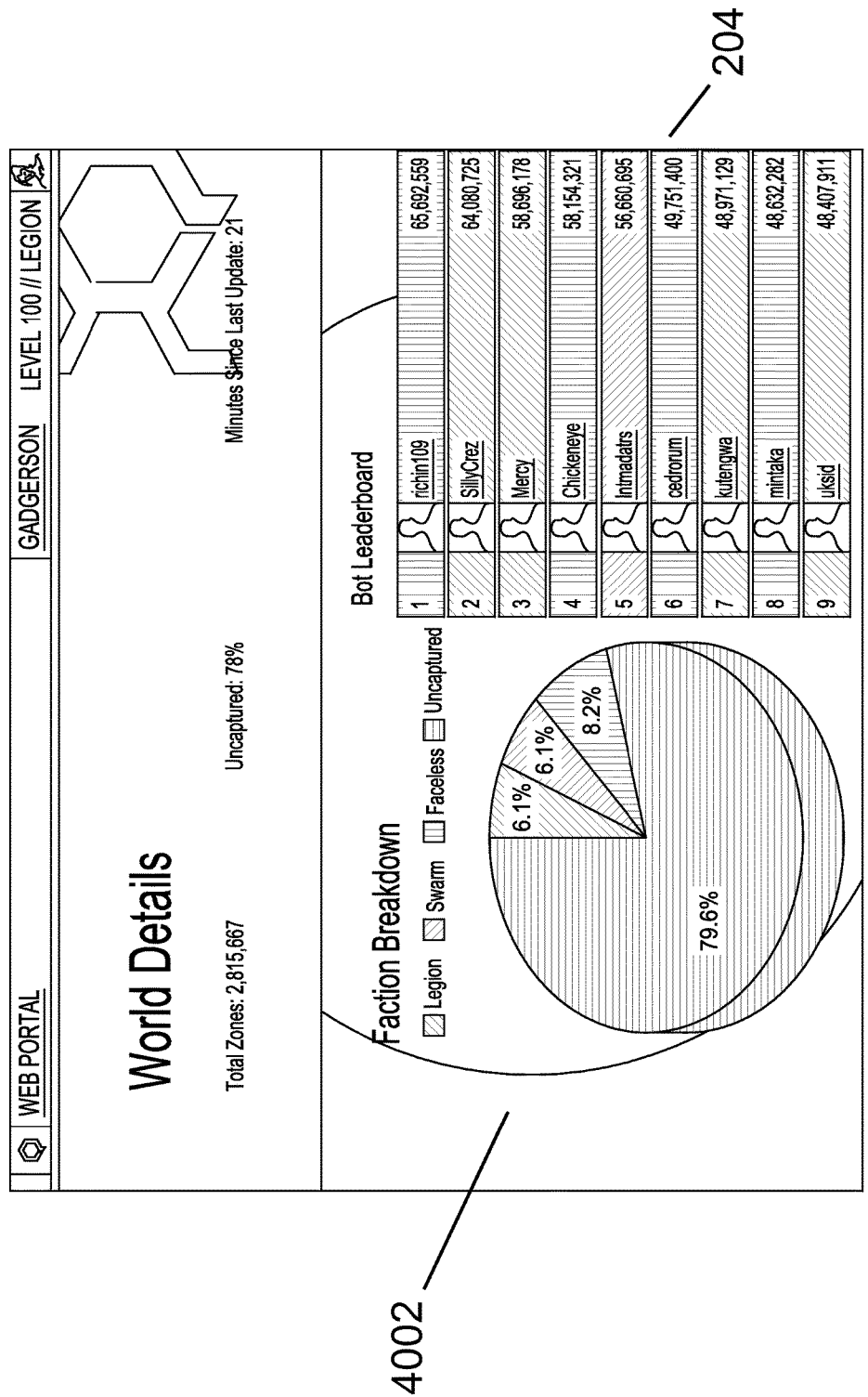
FIG. 6 illustrates an example user interface showing faction breakdown and a list of users with the highest number of bots at the world zoom level according to one embodiment of the present invention.

As illustrated in FIGS. 4, 5, and 6, leaderboards 204 reflect the current state of the game, where all players in the zone, region 4000, country 500 or world 600 are included in the leaderboard counts.

Leaderboards 204 will not be limited to current bot counts for players, but will incorporate many facets of game play. This includes but is not limited to bots killed, zones captured, zones leading, harvesting credits, and purchasing/using special ordnance.

Login

If the application is unable to authenticate a user upon startup (on the player's first time starting the application) the user will be presented with the login screen. Here they may enter their previously created credentials and click Login to get to their Home Screen. Or, if the user has not yet created an account, they may select an option to begin account registration. In one embodiment, a user would click the "Join The Battle" button to begin account registration.

Players who try to log in unsuccessfully will be presented with the option to try logging in again. After several sequential failed attempts, their account may be locked to prevent account hacking.

Map (Zone Level)

The game map within the online or mobile application of the present invention uses standard map tiles and gestures (for example, when using a touch screen smart phone, a user might touch and drag to move, pinch to zoom, etc.). Mobile platforms without pinch to zoom will be given zoom buttons. Players can also re-center the map on their current location.

Figure 3:
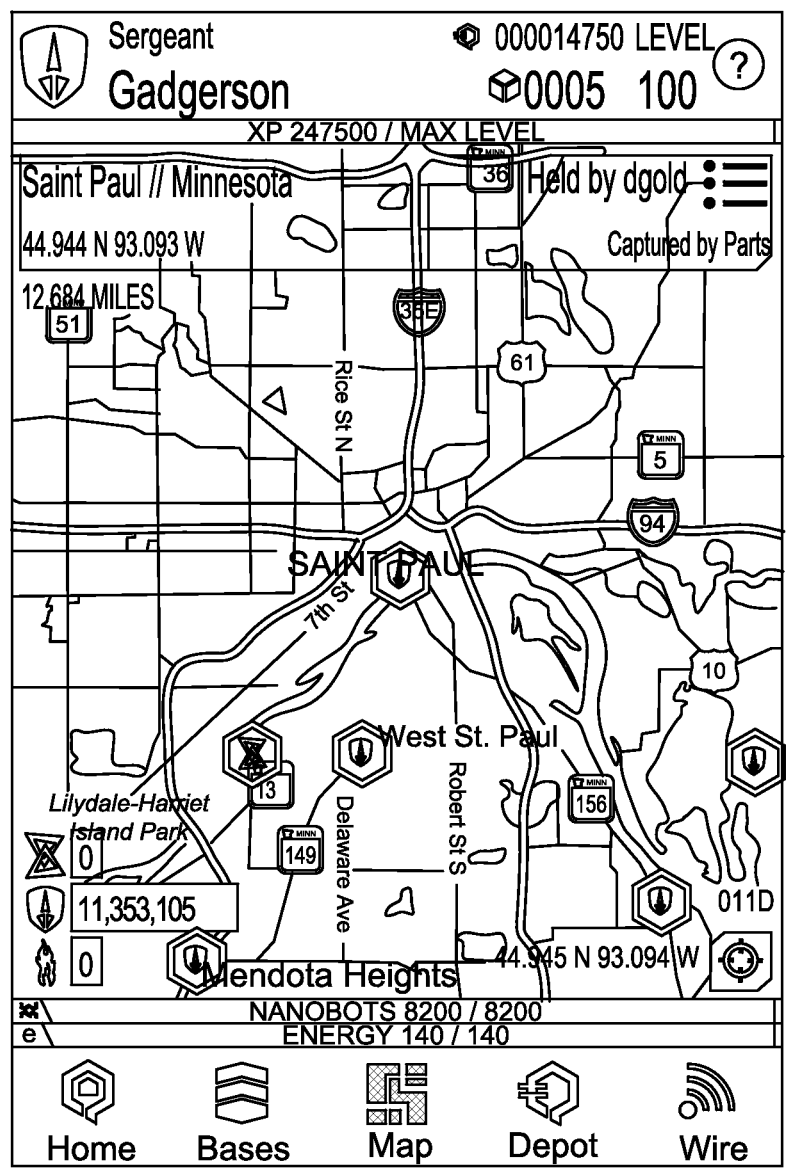
FIG. 3 illustrates an example user interface showing a map according to one embodiment of the present invention.

At zoom levels below sub-country regions, but above hyper-local zoom levels, players see the "Zone Map" 3000 view, as illustrated in FIG. 3. In this view, map tiles are overlaid with pins on every battle zone that show which faction currently controls that zone (if any) and their location relative to the player. Zones correspond to population centers. Most often these are cities, town and villages that are recognized in the real world as having some geo-political jurisdiction. Much less frequently, zones could represent other recognized population centers such as well-known neighborhoods, or commerce centers within a city. QONQR represents a zone on the map by placing a pin at its approximated center of the city, town, or village.

Polygons 3002 may also be used to denote the area of a zone, with the color and shading of the polygon 3002 representing which faction controls the zone, and the strength of control.

Figure 8:
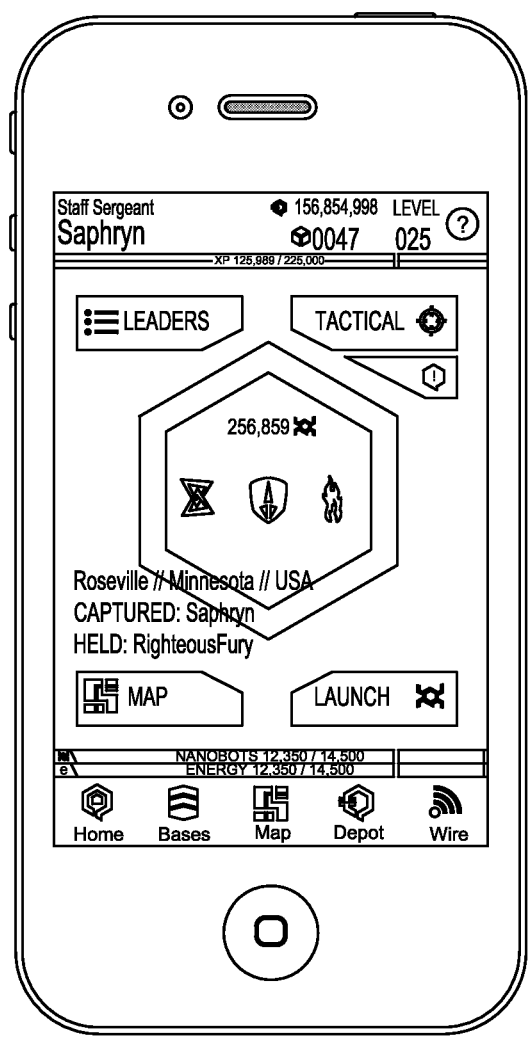
FIG. 8 illustrates an example user interface that may appear after a user selects a pin from the in-game map according to one embodiment of the present invention.

Clicking any zone's pin will open the "Zone Pin" screen 800 (an example of which is illustrated in FIG. 8) for the selected location. Battle zones are at the medium-local level (town, village, neighborhood), not the hyper-local level (building, business establishment, etc.). Hyper-local locations require the player to be in very close proximity (for example, hundreds of feet) to participate in the special benefits associated with that location.

The zone pin will reflect the real-time state of battle for all players who have battle for that zone. The player may refresh the zone information at any time to ensure up to the second status of all players who have impacted in the zone.

The map 3000 will show the players current position at all times, allowing the player to jump to their current position on the map 3000 at any time by clicking a button that will re-center the map 3000 on a location indicator, showing the player's current position.

Map (Zoomed Out)

At the world 600, country 500, and sub-country 4000 region zoom level, zone pins will not be visible. Rather, as illustrated in FIGS. 4, 5, and 6, the map might display a graphical overview representation of the battle on a larger scale, giving the player the ability to see the level of control each faction maintains at the higher levels, sometimes referred to as the faction breakdown 4002. The level of control at lower level regions, such as zone or sub-country, has a direct effect on control in higher level regions, such as country or world. In these map zoom levels, players can quickly navigate to another location and zoom in again, or use the zoomed out view to find areas with high levels of activity.

Multi-Tiered Achievement and Integrated Prestige Systems

QONQR employs a unique system for achievements. There are two types of game achievements, "Medals" and "Ribbons".

Medals are a multi-tiered approach to tracking a player's aptitude in the game. Medals generally measure skills and experience for common game activities, including bot deployments, zone captures, and base harvesting. Players will earn the medal for a core skill for achieving a base level of competence. As the player improves in that competency, they earn bars which represent the level of competency. For example, a player may have deployed nanobots thousands of times to achieve the third level of the deployment medal, but may have only created a single base and harvested enough resources to achieve only the first level of the harvesting medal.

Ribbons are more unique achievements that most players will not achieve. Ribbons will be awarded to players who achieve above average accomplishments such as capturing zones in 10 countries, acquiring all scope upgrades, or switching factions. Ribbons do not have levels of achievement like Medals.

Ribbons and Medal levels will earn the player achievement points. Higher Medal levels are worth more achievements points than lower levels. Ribbons and Medals have achievement points assigned based on the difficulty to accomplish.

The game described herein assigns ranks to players based on their achievement points. In one embodiment of the game, military ranks are used to establish prestige in the game. Each rank requires a minimum balance of achievement points. When a player reaches minimum level of achievement points required for a rank, they are promoted to that rank and will be granted the opportunity to share the promotion through social media.

Some Ribbons can have negative achievement points associated with obtaining the Ribbon. For example, a player may decide to defect from their current faction and join an opposing faction. This act of treason justifies a Ribbon for such a unique accomplishment; however it should also require the player take a demotion in Rank, for switching sides. By assigning negative achievement points, both are accomplished.

Medal Detail

The details for each Medal or Ribbon can be seen on the Medal Detail screen.

Medals and Ribbons may be granted for specific game actions (e.g. number of players recruited) and players can gain more bars and/or stars on their medals/ribbons, as well as new levels of honor based on the number of times that action has been taken (e.g. 1 player recruited, 5 players recruited, 10 players recruited, etc.) Here, players can see their current Medal/Ribbon, level of honor of the Medal/Ribbon, when they began and when they completed this level, and a description of what they've earned and what they might earn next.

Previous and Next buttons (or swipe actions) can be used to page between all the medals and ribbons available to the player.

Medal Wall

The "Medal Wall" shows all available medals and ribbons and distinguishes between those medals/ribbons that have been achieved, and those that still remain to be achieved.

Each medal/ribbon is slightly unique, and the image shows the numbers of bars and stars (the medal/ribbon) as well as the current medal/ribbon level of honor and date achieved.

The Medal Wall screen may scroll either horizontally or vertically (depending on platform) for as much as is required. Medals and Ribbons are granted for actions like Recruitment, Lifetime Kills, Reinforcement, Resources Harvested, Weapons Utilized, Player Knockouts, Exploration, Zones Captured/Controlled, Regions Captured/Controlled, Countries Captured/Controlled, Base tagging, Social Media Actions, Date Specific Actions, and Deployments at famous Points of Interest, among other actions.

Message Detail

Clicking on a message in the Wire opens the Message Detail Screen. Here, players can see details such as who the message is from, the date it was sent, the full body of the message itself, and can reply to the message or delete it.

Clicking "Delete" will prompt the user to confirm before deleting. Clicking reply will take the user to the "Message Send" screen where the "To" field will be automatically populated with the player's codename from whom the original message was sent.

If the sender of the message is not another player, and a player with whom the user is a friend, the reply button will be unavailable.

Message Send

Clicking the "Create" button on the Wire or hitting the "Reply" button from the Message Detail screen opens the Message Send screen. Here players can compose a message to in-game friends. Messages may only be sent to other players who are friends with the sending player, or players who allow public messaging.

The player can either click Cancel to return to the previous screen, or Send Message if they have finished composing and wish to transmit their message.

Player Search

In one embodiment, a user interface allows a user to search for another player. Users can search for other players by codename. Players with codenames that match (at least in part) the specified search string will be returned in a result set.

Each row represents one player and shows that player's profile picture, codename, rank, and faction color. Each row is a button link to that player's Profile Screen. The list of results can scroll as far as necessary.

New searches can be done directly on this screen as well.

Player Settings

Players can adjust their application settings from the Player Settings Screen (reached via the Home Screen).

Here players can perform tasks such as update their profile pictures, change their password and email address, update notification preferences, link their Twitter and Facebook accounts, specify the player who recruited them, and review the Privacy Policy.

Profile (Others)

While the player can review their own Home Screen at any time to get all available details about themselves, the amount of data available in regard to other players is limited. When players look at the Profile Screen of another player, they see that player's profile picture, name, level, faction, and rank. They can visit the player's medal/ribbon wall, and see their friends list.

Users can also send a friend request, send a message (if the player is already their friend), or remove the player from their friend list (again, if the player is already their friend). Users can also search for other players directly from this screen.

Rank Detail

In addition to standard, experience-point based leveling, players can advance in rank from Private all the way up to General. Rank titles may vary in some embodiments of the present invention. Players are awarded rank advancement based on the number and significance of the medals and ribbons they earn.

The Rank Detail screen shows the player's progress toward the next available rank. Once all requirements have been fulfilled, the player will be promoted to the next highest rank and given the opportunity to share that news on other social networks, such as Twitter and Facebook.

Ranks

The Ranks Screen shows the player's current rank, all ranks the player has achieved, the date those ranks were achieved, and the future ranks which the player has not yet successfully attained.

Clicking the current rank, any of the achieved ranks, or any of the unachieved ranks will take the player to the Rank Detail screen for the specified rank. The screen will scroll as far horizontally (or vertically depending on platform) as necessary to show all ranks.

Registration

If a user does not have an existing account they must go through the registration process before playing the game described herein. Some registration steps are optional, and some embodiments of the present invention may require greater or fewer steps for registration.

In one embodiment, a user is instructed to select a Codename (which must be unique) and a password. They are encouraged to enter their email address as well, but this is optional.

Year of birth is optional on some platforms, and if not entered the user will be prompted to verify they are at least 13 years old. Gender is optional.

Finally, the user must choose which faction to affiliate themselves with. In this example of the game, The Legion is opposed to QONQR and intends to destroy it, The Swarm are supportive of QONQR and try to defend it, and The Faceless are hackers who do not care if QONQR is evil or benevolent (they just want to take it for themselves). In one embodiment, part of the registration process may be to provide details regarding each faction to the new user to facilitate their decision.

Once registration is complete, the user is sent to their home screen where the first brief tutorial begins. They will stay logged in unless they specifically log themselves out.

Schematics

In addition to using bots to form offensive, defensive, and support command formations, they can be used to construct persistent world objects, for example, base enhancements. The number of bots required to build an object exceeds the capacity of the player's scope, so they must contribute to building a schematic over time (using the Contribute button). The progress bar indicates how long before the schematic will be fully constructed. In one embodiment, a user can contribute to building schematics and view the progress of schematic construction.

Once a schematic is ready it can be created. For example, to place a bunker in a base, a player must first obtain the Bunker Schematic and then contribute enough bots to construct it; finally the player can place the constructed bunker in the previously created base of their choice where it will impact base and/or zone.

Clicking a schematic name will take you to the Schematic Detail Screen.

The Schematic Detail Screen shows the name, image, and description of the item the schematic describes. Players can contribute bots to their creation here, as well as salvage items in exchange for some portion of their bots being returned. Schematic images are custom-animated, wire-framed 3D object technical specifications.

Splash

The Splash Screen is displayed momentarily when the application first launches. This gives the application time to contact the game server to check for new and/or updated content. The game is required to sync with the game server before the user can begin playing. The Splash Screen will disappear after a few seconds, or—if the game server cannot be reached—an appropriate error message will be displayed.

Tactical

The Tactical Screenshows detailed information about a specific battle zone. In addition to the zone, region, and country name, the Tactical Screen shows which modifiers have been applied in the specified zone. Modifiers are created by support bots and impact either damage or shields at the faction level. This screen also shows a player exactly how many and exactly what types of bots he currently has deployed in the specified zone. The screen will scroll as far vertically as required to display all the command formation types the player currently has in the zone.

Tutorials

At key points in the game, when players encounter new functionality, they will be presented with quick tutorials. These tutorials are in the form of a screen overlay with the player's Faction Leader explaining the new functionality as if to a new recruit. Players can choose to skip the tutorial if they desire.

Wire

The Wire is one of the top level game screens (reachable from the navigation bar) and is the player's in-game communication hub.

Here, messages of all types are displayed in an updated stream sorted reverse chronologically.

Messages might be from other players or from Faction Leaders. They could be alerts about zones the player has bots and/or bases in, as well as account level messages from administrators.

Players can click a message to see that message's details. Messages that are new show a bright envelope icon, while those that have already been read show a dimmed envelope icon.

Messages may have a zone reference attached to them, allowing players to direct action towards a specific zone. This makes it easier for players to coordinate strikes against a zone for the mutual benefit of capturing and controlling the zone, and the resources it contains.

Wire Settings

The Wire Settings Screen enables players to customize the types of messages they want to receive in the Wire.

From here, they can click on or click off messages from friends, faction alerts, messages regarding zones in which they have bots and/or bases, and account alerts.

Clicking save will persist the user's chosen preferences. They will be applied the next time the player accesses the Wire.

Zone Pin

Clicking a pin on the Zone Level map causes that pin to open up and show details about the specified battle zone. An example of this function is illustrated in FIG. 8.

The pin shows which faction currently controls the zone and how many bots they have there, who has captured and who controls the zone (if anyone). Players may use this screen as a launching point for many Zone related activities including the Tactical Screen, the Launch Screen (see FIG. 1), and the Leaderboard (see FIG. 2).

Players can also send an alert to all their friends to request help if they are losing the zone. Clicking the Map Button returns the player to the Zone Map view, an example of which is illustrated in FIG. 3.

Zone Search

Figure 9:
FIG. 9 illustrates an example user interface wherein a user can search for zones within the mobile application in one embodiment of the present invention.

As illustrated by the example shown in FIG. 9, users can use the search screen 900 to search for zones by city/neighborhood name, region name, and/or country name. Zones, regions, or countries with names that match (at least in part) the specified search string will be returned in a result set.

Each row represents one zone and shows that zone's name, the associated region name, the associated country name, and the controlling faction color. Each row is a button link to that zone's Tactical Screen. The list of results can scroll as far as necessary. New searches can be done directly on this screen as well.

Command Center

Players logging in to the game described herein from their home computer instead of a smart phone or other mobile device will experience the Command Center view which will provide much of the same functionality as the mobile interfaces (minus those screens requiring location-awareness), but will be formatted for standard monitor sizes.

The Command Center may also have a more sophisticated Strategic Map, and a more detailed and complex interface to Base construction, resource management, and structure technology trees. The Command Center acts to extend the game from the mobile gaming environment to the PC/Mac gaming environment. Regardless of how users access the game, it is the same game across all environments.

Faction and World Events

Some events will need to be coordinated between many members of each faction (i.e. constructing a large schematic or researching new command types) while a few rare events will need to be coordinated between members of all factions (i.e. subduing worldwide catastrophes).

Game expansions will be released on a semi-regular basis, and these will often correspond with faction and world events to unlock new content.

Interaction with Real World Data

High level players will be able to purchase items and upgrades that enhance command formation effectiveness based on real world weather in the location that the bots are deployed. The game described herein will use real time data to enable players to include their local weather conditions as a part of their strategic play session. Game mechanics are implemented in such a manner that long term game outcomes are not only determined by current weather, but also weather in the future, thereby creating a game mechanic that incentivizes players to research the weather forecast to maximize their game effectiveness.

Game players deploy game resources that are persistent until destroyed by other players or by automated game mechanics. Deployed resources are geo-tagged with the latitude and longitude of the location of the deployment, as determined by the player's physical real-world geographic location using the player's latitude and longitude from their mobile device. If players do not have a specific latitude and longitude, the coordinates of a predetermined nearby location will be used. Long term survivability of the deployed game resources are affected daily and hourly by the real time current weather at the location. This game mechanic in turn creates an emphasis on making game actions dependent on predictions of the weather in the future.

Game resources have starting attributes that make each resource behave differently based on weather conditions. For example, some resources may be highly effective when weather conditions are warm and sunny, but completely ineffective when cold or in rain. Such fair weather resources may be completely destroyed during severe weather. Additionally, some resources may be moderately effective in fair weather, but have much higher rates of effectiveness compared to all other resources during poor weather conditions. Players may choose to upgrade resource attributes to change effectiveness or survivability. Knowing the expected weather forecast will cause players to change the resources they employ, or apply upgrades that will give them the best chance of persistence through the future weather conditions.

Algorithmic responses to news stories, using trending topics on Twitter or popular news topics, will be spun as though the event was somehow related to the fictional battles taking place within the game. This "spillover" from the game world into the real world will enhance the immersive effect for existing players as well as increase exposure for new potential players.

In a game that employs real-world geographic location as part of the game, real-world news stories are incorporated as part of the game content. News stories are identified by their classification (technology, lifestyles, world events, economic, disaster) and are included in the game as part of the game content. News stories that have a related location are matched to game experiences for players near that location in the physical world, while doing activities related to that location based on latitude and longitude.

News feeds are implemented into the game as part of an in-game news feed of current events. Players may be able to view current events, rating and sharing the stories if they like. The stories are used as game content, creating a unique game experience that ties the game world to the real world. Game stories, and the way players rate and share them, can impact the game through changing resource allocation or resource effectiveness. News reports can help to supplement or expand the game story.

In-game missions will coincide with real world social and volunteer needs. Players can be rewarded for assisting in emergency situations, voting, donating to charities, giving blood, etc. By providing in-game rewards for good deeds in the real world, players can feel good about playing games while making the world a better place.

Sponsored Battlegrounds

Certain battlegrounds may be sponsored by retailers, conferences, concerts and other businesses. These sponsored battlegrounds are specific locations (e.g. a Best Buy store) where players can get special abilities or achievements for playing on site. These can be solely location-based, or they can be a weapons cache, where users must scan a specific item before receiving their reward. In some examples, a sponsor may have a semi-temporary point of interest on the game map, driving players to physical location in the real world, which in turn will give the player a game benefit while visiting that location.

Businesses and other points of interest that are not participating sponsored battlegrounds may still be game locations. Players can travel to these locations to scan for resources. Resources discovered in these locations can be used to upgrade the player's scope and weapons.

Players can also leave "Nanomines" in businesses or other points of interest to explode when the next enemy faction player scans that location, which might have undesirable results for such enemy faction player and provide incentives for the player who left the Nanomine.

Squadrons

Players will be able to form their own squadrons to complete covert missions. A "squadron" as used herein refers to a group of players within a faction that work together toward the same result. Examples of missions taken on by squadrons may involve securing certain locations, opening teleportation portals for console players, or assembling or destroying large persistent world devices that would normally be too large for a single player to create.

Notifications

Players can configure the application to allow or disallow push notifications. Notifications will alert the player to important game events even when the application is not actively running on the player's device.

Non-Player Character Interaction

Non-Player characters, especially Faction Leaders, will spill out of the boundaries of the game and interact with players in other social networks. Faction Leaders will have websites, Twitter and Facebook accounts, and will hold press conferences and protest rallies.

Players who achieve a prestigious medal or attain a high rank will receive personal congratulations from their Faction Leader posted on their Facebook wall through scripted exchanges that feel real. Actors and actresses portraying the in-game characters may record short videos praising or deriding players who conquer important zones.

GeoSocial Gaming Platform

The game of the present disclosure is constructed in a manner that enables "skinning" for future geosocial game titles. Using the same architecture and infrastructure, new flavors of the game described herein (for example, fantasy, gardening, exploration, business white-labeling, etc.) can be created and released in an efficient manner.

GPS and WiFi Enabled Merchandise

Game related toy devices (molded plastic guns, scanning devices, shields, etc.) that can integrate with smart phones to pull GPS data as well as other player game data will be available for players who want to take their gameplay to the next level of realism. A friendly game of laser tag suddenly has global implications!

Augmented Reality

The online and mobile application described herein allows players to create structures in the virtual game world, but tied to actual GPS locations in the real world, by building the structure on the map of the real world. This gives the application the unique opportunity to even further bring the game into the real world through augmented reality. Players will be able to move to the same GPS coordinates in the real world that match the coordinates of the virtual structure created in the game world. Players will then be able to use the camera on their smart phone or other mobile device to view the terrain of the real world around them. The smart phone will use the combination of compass, gyroscope, and GPS sensors to determine the direction and movement of the camera, and overlay a virtual rendering of the structure created in the game, on the camera display. This augmented reality implementation will give players the ability to view the game world as it surrounds them in the physical world, a unique view into the game, through the lens of a virtual scope. Players will be able to view the bases they have created in this manner, as well as other physical structures players may build in the game.

Within a location-based game, players may create a structure in the game in a familiar top-down game interface that allows players to build buildings, using the map of the real world as a background. Once the building has been created, the player may use the camera on a mobile device to view the structure in three-dimensional space, exploring the interior and exterior of the building through augmented reality capabilities of the mobile device.

A player will use a top-down game board to design a structure or building. This building will be placed on the map of the real world. The structure will be tied to a physical real-world geographic location based on the latitude and longitude of the building when placed on the map. When a player visits this location in the real word, they may use their smart phone (or other mobile device) camera to view the structure in an augmented reality view. The mobile device will determine the player's location in the real world, using the player's latitude and longitude provided by the mobile device. The application will then render a three-dimensional drawing of the structure overlaying the real world images on the phone. In this manner, the player will be able to view the virtual structure in the real world, as it was built and designed in the virtual world.

Multi-Hierarchy Location Database

The online and mobile application described herein leverages a proprietary location database. This database creates multiple layers of relevancy for players and is one of the greatest reasons for the widespread interest in the game. The main location layer of the game is at the city and town level. People have a great sense of loyalty and pride in their hometowns, where they went to college, where they live, work, and vacation. The game of the present invention takes advantage of this location-based pride in the real world, and associates the main game layer with those towns and cities that inspire the most emotion in its players. This drives increased player engagement and incentivizes players to brag about their accomplishments on social media and also person to person, thus increasing the exposure the game gains in the marketplace.

The presently described application also implements multiple layers of location. At the highest levels, town and cities are members of states (or provinces) and states are members of countries. This location hierarchy gives players greater incentive to expand their area of influence well beyond the bounds of their favorite towns, so they may gain notoriety at the upper levels of the hierarchy. For example, a player may expend far more time and resources to capture dozens or hundreds of cities, so they may be the top player in the state, or country. By exposing multiple roll-up layers of locations, the application drives greater player engagement, and stronger incentives to engage in social sharing, thus creating greater exposure to the marketplace.

The higher levels of the location hierarchy will have the same type of player impact as the lower zones. For example, regions (states) and countries may be colored and shaded as the zones are colored and shaded, to show which factions have the most zones under control, or the greatest strength in their nanobot armies. Other visual representations may also be used to aggregate zones into collections that allow for additional ways to represent control in a geographic area. A single player's actions therefore not only impact the zone in which they battle, but also all areas in the hierarchy above the zone, including the region and country.

Higher levels of location hierarchy will include leaderboards for players who have activity in the underlying zones.

Finally, the application allows for hyper-local locations. By creating the opportunity for players to engage at specific locations, such as buildings or parks, the application gives players the opportunities to find meaningful and impactful incentives to battle, even if they feel they will have no ability to impact control for larger battle areas. Because all levels have a relationship to the levels above and below, activity at any level has an impact on the levels above.

Social Sharing

The application's location integration allows players to capture the physical places in the real world that are relevant and meaningful to them personally. In addition, the application enables social sharing (through social networks such as Twitter and Facebook) so players can express their pride and passion for those locations through social media posts that brag of their gaming exploits and conquests.

Harvesting Zone Resources

Bases collect resources, which in turn are sold for credits when the player harvests them. Resource collection speed is impacted by the faction that controls the zone, in which the base resides. When an enemy faction controls the zone, resources collect more slowly.

Resource collection is also impacted by player tags and reinforcements, which tear down or boost productivity. Players may tag (graffiti) an opponent's base to reduce its production rate, which the owning player will need to remove in order to return the base to its optimum collection level. Additionally, friends can assist a player's collection rate by reinforcing the base.

Population in the zone is just as important as these collection mechanics. The application of the present invention uses real world population data to approximate the wealth of resources in the zone. The zone's abundance of resources will allow bases in that zone to collect resources at a faster or slower rate, depending on its rating of abundance. While it is easy for a player to establish a base in a remote part of the countryside and defend it from heavy opposition, that base will not have the resource collection potential that a base in a large city may offer. The player must decide whether to collect a small volume of dependable resources, or to collect resources in highly contested areas and fight diligently to maintain control of the highly contested zone to maximize the resource collection.

Positioning Within the Game

Players' positioning in the game is determined using a combination of methods. Battle zones (corresponding to cities and towns) have a geospatial polygon which defines the borders of the battle zone. Polygons are derived using mathematical algorithms to identify the boundary lines that delineate the collection of GPS coordinates that are closest to each zone's central GPS coordinate. Geospatial queries are then used to query the database to identify the single zone in which the player if located.

When a zone cannot be found in this manner, for example when a player is on a large body of water such as Lake Superior or the Gulf of Mexico and therefore is not standing within the bounds of a battle zone, a fall back routine will be used to find the closest battle zone. The database is queried to find all battle zones within a multiple mile GPS grid. Then each zone will apply the Haversine method for ascertaining the distance between two GPS coordinates while taking the curvature of the earth into consideration to find the distance from the player's current position and the GPS center of nearby zones. The closest zone will be considered the player's current zone.

If a player's zone cannot be located using either method, the player is considered to be too far away from land (in the ocean) and cannot effectively deploy nanobots to have an impact on the battle.

System Technical Components

Figure 10:
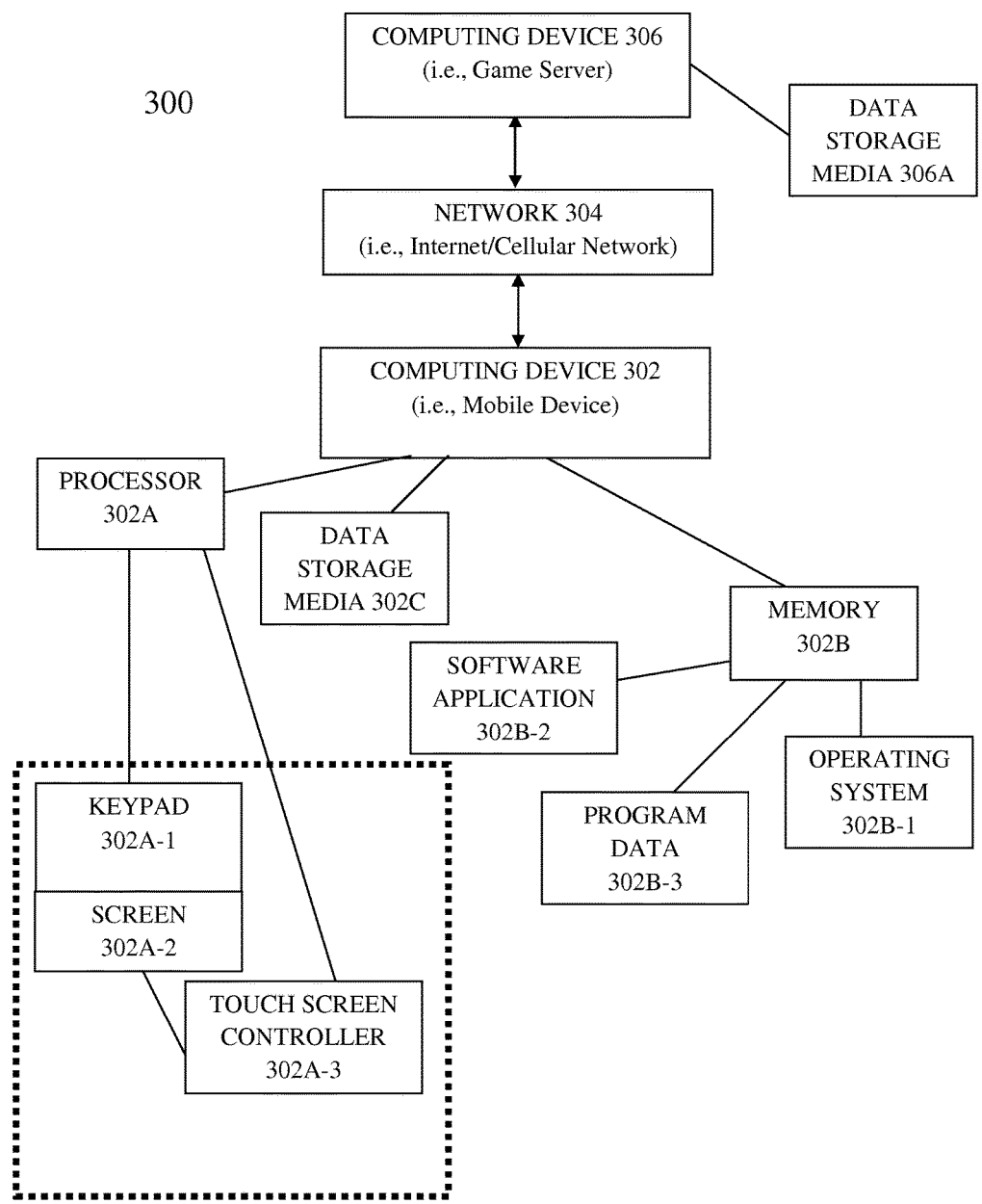
FIG. 10 is a schematic block diagram of an example computing system.

FIG. 10 is a schematic block diagram of an example computing system 300. The example computing system 300 includes at least one computing device 302. In some embodiments the computing system 300 further includes a communication network 304 (such as the internet or a cellular network) and one or more additional computing devices 306 (such as a game server).

Computing device 302 can be, for example, a smart phone or other mobile device, a tablet computing device, a netbook, a computing device located in a user's home or any other computing device. Computing device 302 can be a stand-alone computing device 302 or a networked computing device that communicates with one or more other computing devices 306 across network 304. Computing device 306 can be, for example, located remote from computing device 302, but configured for data communication with computing device 302 across network 304. Computing device 306 can be, for example, a game server.

In some examples, the computing device 302 or 306 includes at least one processor or processing unit 302A and system memory 302B. Depending on the exact configuration and type of computing device, the system memory 302B may be volatile (such as RAM), non-volatile (such as ROM, flash memory, etc.) or some combination of the two. System memory 302B typically includes an operating system 302B-1 suitable for controlling the operation of the computing device, such as the WINDOWS® operating systems from Microsoft Corporation of Redmond, Wash. or a server, such as Windows SharePoint Server, also from Microsoft Corporation. To provide further example, if the computing device 302 is a smart phone or other mobile device, the operating system 302B-1 may be iOS, WP7, or any other available mobile operating system. The system memory 302B may also include one or more software applications 302B-2 and may include program data 302B-3. The software applications 302B-2 may be in the form of mobile applications in examples wherein the computing device 302 is a mobile device.

The computing device 302 may have additional features or functionality. For example, the device may also include additional data storage devices 302C (removable and/or non-removable) such as, for example, magnetic disks, optical disks, or tape. Computer storage media 302C may include volatile and nonvolatile, removable and non-removable media implemented in any method or technology for storage of information, such as computer readable instructions, data structures, program modules, or other data. System memory, removable storage, and non-removable storage are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device. An example of computer storage media is non-transitory media. The computing device 306 includes data storage media 306A, such as the data storage media 302C described above, on which game data is stored.

In some examples, one or more of the computing devices 302, 306 can be a smart phone or other mobile device. FIG. 10 includes a schematic diagram of such device. The computing device 302 may be a smart phone or other mobile device with input device options including, but not limited to, a keypad 302A-1, a screen 302A-2, or a touch screen controller 302A-3. In other examples, the computing device can be a personal computing device that is networked to allow the user to play the multiplayer game disclosed herein at a remote location, such as in a player's home or other location. In some embodiments the rules of game play are stored as data instructions for a smart phone application. A network 304 facilitates communication between the computing device 302 and one or more servers, such as computing device 306, that host the multiplayer game disclosed herein. The network 304 may be a wide variety of different types of electronic communication networks. For example, the network may be a wide-area network, such as the Internet, a local-area network, a metropolitan-area network, or another type of electronic communication network. The network may also be a cellular network in some embodiments. The network may include wired and/or wireless data links. A variety of communications protocols may be used in the network 304 including, but not limited to, Ethernet, Transport Control Protocol (TCP), Internet Protocol (IP), Hypertext Transfer Protocol (HTTP), SOAP, remote procedure call protocols, and/or other types of communications protocols.

In some examples, computing device 306 is a Web server. In this example, computing device 302 includes a Web browser that communicates with the Web server to request and retrieve data. The data is then displayed to the user, such as by using a Web browser software application. In some embodiments, the various operations, methods, and rules disclosed herein are implemented by instructions stored in memory. When the instructions are executed by the processor of one or more of computing devices 302 and 306, the instructions cause the processor to perform one or more of the operations or methods disclosed herein. Examples of operations include the operations of game play and enforcement of one or more rules of the game.

Further, the computing device 302 or 306 may include image capture devices, whether a dedicated video or image capture device, smart phone or other device that is capable of capturing images and video. Further, the system may include smart phones with native or web-based applications that can capture, store and transmit time-stamped video and images to a central server. The system and method can also include location-data captured by a GPS-enabled application or device. The computing device 302 or 306 may also have WiFi or 3G capabilities.

Figure 11:
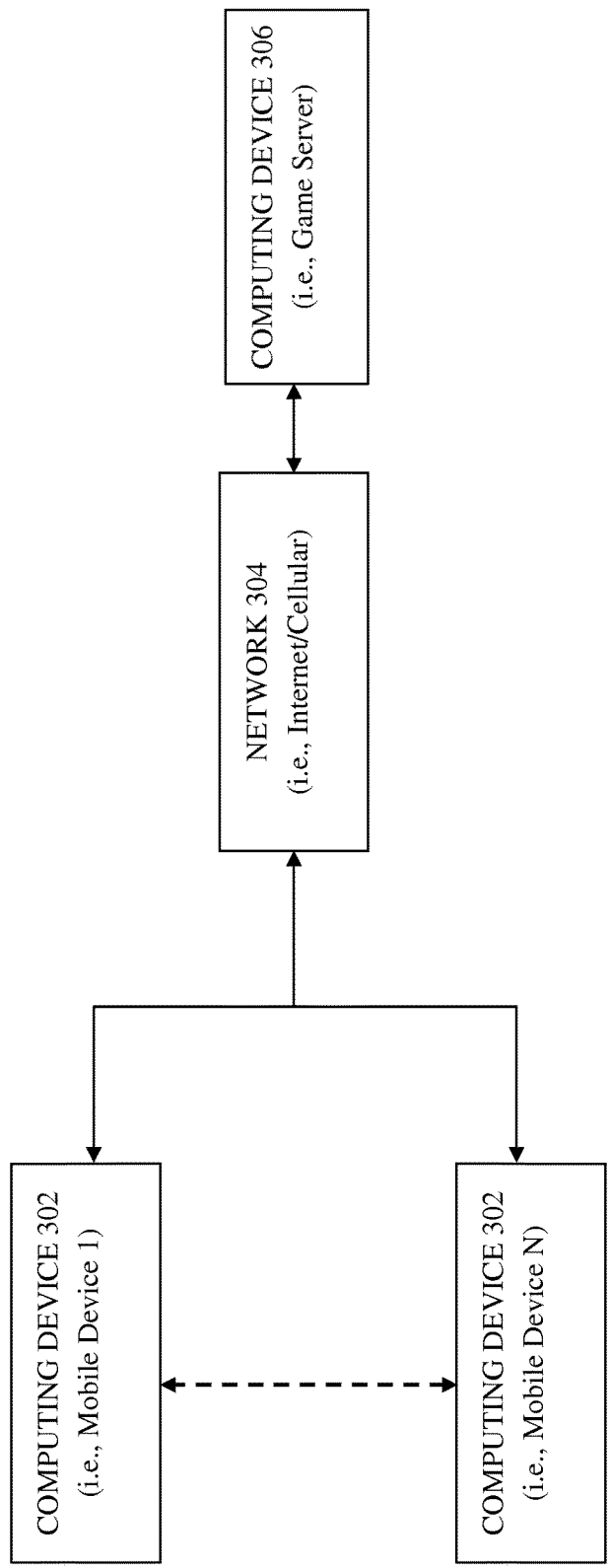
FIG. 11 is a schematic block diagram of an example system facilitating a location-based multiplayer game played using multiple mobile devices according to one embodiment of the present invention.

Referring now to FIG. 11, some embodiments of the game disclosed herein may be played by any number of players using a plurality of computing devices 302, for example, multiple mobile devices. A computing device 306 communicates with the plurality of computing devices 302 via a network 304. In the example illustrated by the diagram of FIG. 11, a game server 306 wirelessly communicates with a plurality of mobile devices 302 via the internet or a cellular network 304. The mobile devices also communicate with each other in this example to execute the functions of multiplayer gameplay. Further, information is sent by the plurality of computing devices 302 via the network 304 back to the computing device 306 to store and use information for continued gameplay.

Figure 12:
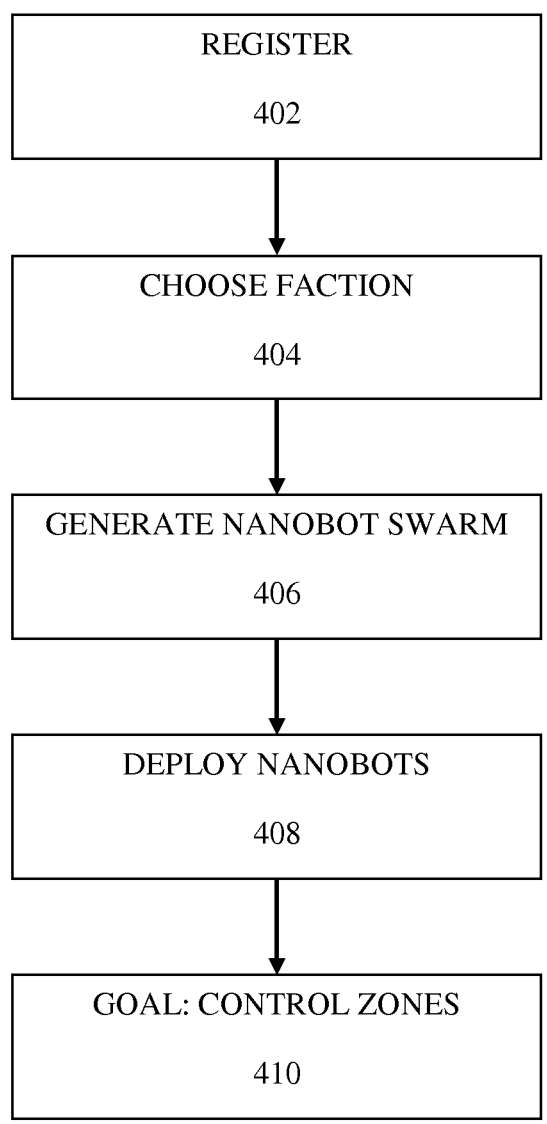
FIG. 12 is a flow chart demonstrating one possible embodiment of the gameplay described herein.

FIG. 12 is a schematic block diagram illustrating one embodiment of the flow of gameplay 400 as described herein on a very high level. A user must first register for a user account within the application (402). The user then chooses a faction (402) and generates a nanobot swarm (406). The user then deploys the nanobots (408) in an effort to reach the goal of controlling zones within the game (410).

The various embodiments described above are provided by way of illustration only and should not be construed to limit the claims attached hereto. Those skilled in the art will readily recognize various modifications and changes that may be made without following the example embodiments and applications illustrated and described herein and without departing from the true spirit and scope of the following claims.

What is claimed is:

1. A game system comprising:
a server configured for data communication with a plurality of GPS-enabled wireless computing devices across a network;
wherein the server is further configured to receive and send location information associated with the plurality of GPS-enabled wireless computing devices; and
wherein the server is further configured to send and receive data from the GPS-enabled wireless computing devices corresponding to a set of game rules, wherein the game rules:
define a plurality of zones, wherein:
the zones correspond to geo-political boundaries of cities, wherein a user's game play actions within a city and its corresponding zone impact a nested hierarchy of geo-political boundaries selected from the group consisting of a state and a country; and
the user having a designated starting level of competency can impact a virtual representation of the plurality of zones through the user's gameplay;
require a user having a real world location to join a faction;
permit the user to build one or more bases in locations that are in at least one zone within the virtual representation of the plurality of zones, wherein:
the location in which each base is constructed corresponds to the user's real world location at the time of construction;
after construction, each base remains in its location regardless of the user's movement to or from each base; and
the zone that each base is located in belongs to an enemy faction, the user's faction, or no faction;
permit the user to extract resources from the one or more bases at a predetermined frequency, wherein the predetermined frequency is determined by each base's location within the enemy or the user's faction, the predetermined frequency of extraction being higher if the base is located within the user's faction compared to the enemy faction;
permit the user to exchange the extracted resources for a currency;
permit the user to deploy virtual game pieces into a target zone at any time the user is within range of the target zone, wherein:
the target zone is one of the plurality of zones;
the virtual game pieces have a predetermined launch range;
the virtual game pieces are launched from the user's corresponding real world location;
the user's corresponding real world location is within range of the target zone if the virtual game pieces' predetermined launch range is the same distance or a further distance than the distance between the user's corresponding real world location and the target zone; and
the virtual game pieces are launched to take an action, the action selected from the group consisting of attacking the enemy faction, defending the user's faction, and supporting the user's faction;
allow one faction to control each of the plurality of zones, wherein one faction controls a zone if it has the greatest number of virtual game pieces in the zone;
permit the user to increase in the user's level of competency after releasing a predetermined number of virtual game pieces; and
permit the user to asynchronously communicate with the other users.

2. The system of claim 1, wherein the game rules further dictate that the predetermined frequency of resource extraction is based on real world population of the zone, wherein a zone with a higher population will increase the predetermined frequency of resource extraction and a zone with a lower population will decrease the predetermined frequency of resource extraction.

3. The system of claim 1, wherein the game rules further permit the user to create persistent world objects by contributing virtual game pieces to a schematic.

4. The system of claim 1, wherein the game rules further permit the user to communicate with the other users in real time.

5. The system of claim 1, wherein the game rules limit the user to creating one base per zone.

6. The system of claim 1, wherein the game rules allow the user to leave the user's current faction and join a new faction.

7. The system of claim 6, wherein, according to the game rules, the user's virtual game pieces are destroyed when the user leaves the user's current faction.

* * * * *